July 10, 1923.
M. H. DAMERELL
INDICATING DEVICE
Filed Dec. 2, 1919
1,461,083
2 Sheets-Sheet 1
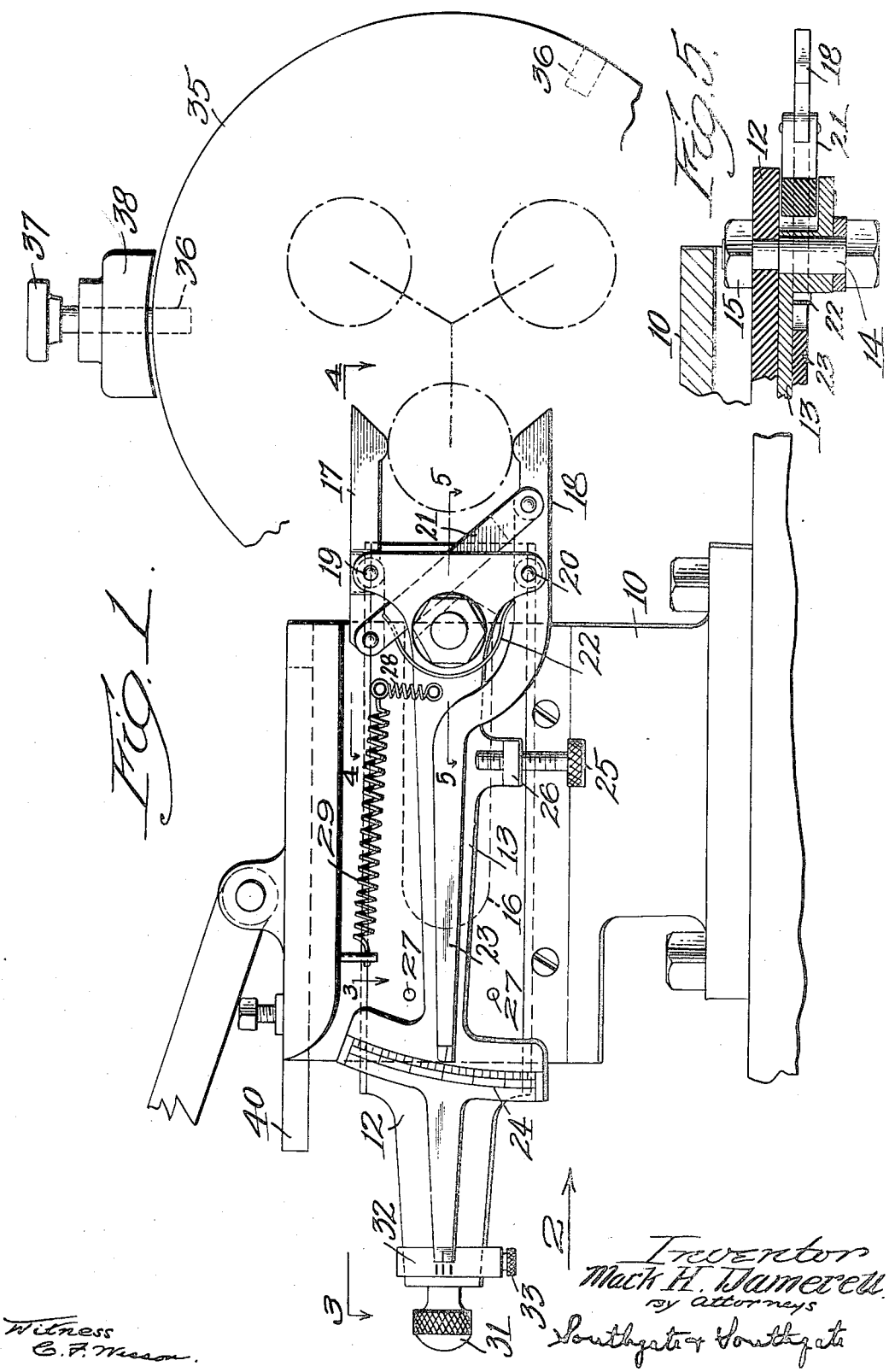

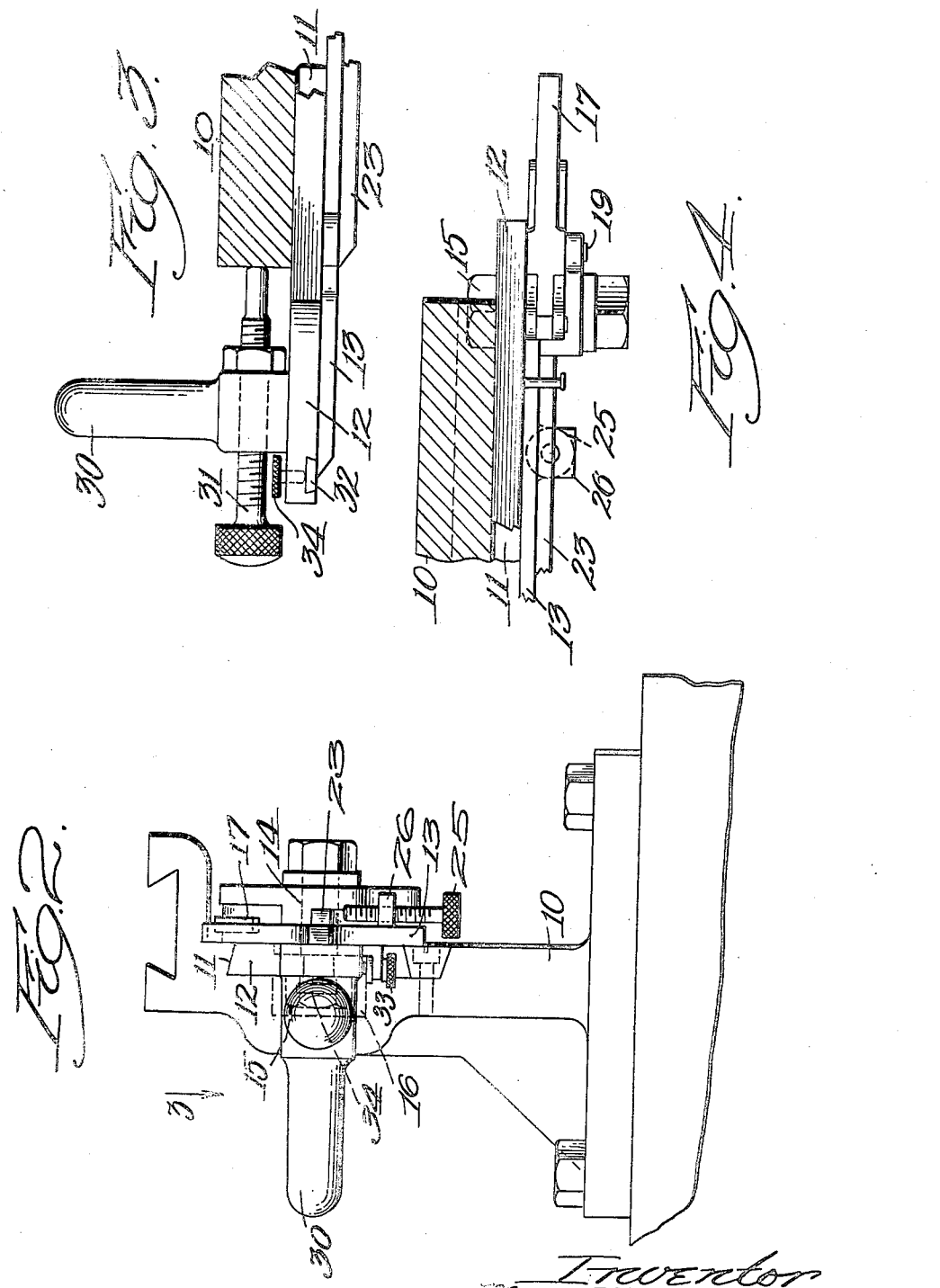

Patented July 10, 1923.

1,461,083

UNITED STATES PATENT OFFICE.

MARK H. DAMERELL, OF WORCESTER, MASSACHUSETTS, ASSIGNOR TO WYMAN-GOR-DAN COMPANY, A CORPORATION OF MASSACHUSETTS.

INDICATING DEVICE.

Application filed December 2, 1919. Serial No. 341,945.

*To all whom it may concern:*

Be it known that I, MARK H. DAMERELL, a citizen of the United States, residing at Worcester, in the county of Worcester and State of Massachusetts, have invented a new and useful Indicating Device, of which the following is a specification.

This invention relates to an indicating device capable of general application, but particularly designed for use in testing crank shaft forgings.

For this purpose it is desirable to indicate both the actual diameter of each crank, and also the relative angular position thereof. It is the general object of my invention to provide a simple device capable of determining and indicating both of these factors at a single operation.

With this general object in view, my invention relates more particularly to certain arrangements and combinations of parts hereinafter fully described and more particularly pointed out in the appended claims.

A preferred form of my invention is shown in the drawings, in which

Fig. 1 is a side elevation of my improved indicating device;

Fig. 2 is a front elevation thereof;

Figs. 3 and 4 are partial sectional views taken along the lines 3—3 and 4—4 in Fig. 1, and Fig. 5 is a detail sectional plan view taken along the line 5—5 of Fig. 1.

Referring to the drawings, I have indicated a stand 10 having a guideway 11 (Fig. 2) in which a slide 12 is movably mounted. A lever 13 is pivotally mounted on a shoulder stud 14 secured in the slide 12 by a nut 15 (Fig. 5). The stand 10 is cut away as indicated in dotted lines at 16 in Fig. 2, to provide clearance for the nut 15 as the slide is moved along the guideway 11.

A pair of gauge bars 17 and 18 are pivoted at 19 and 20 to the rear end of the lever 13. These gauge bars are reversely connected by a short link 21 and have their rear ends yieldingly forced towards each other by a U-shaped spring 22. The lower gauge bar 18 has a forward extension 23, adapted to cooperate with graduations 24 formed on a widened portion of the lever 13.

A screw 25 threaded in a lug 26 formed on the lever 13 acts as a stop to limit the movement of the gauge bars towards each other under the influence of the spring 22, and a pair of stop pins 27 in the slide 12 limit movement of the lever 13 in both directions.

A spring 28 is secured at one end to the slide 12 and at the other end to the lever 13, and causes the lever to normally engage the upper pin 27. A second spring 29 connected at one end to the slide 12 and at the opposite end to the stand 10 normally moves the slide 12 to the left in Fig. 1, or away from the work.

A handle 30 (Fig. 3) is provided by which the slide 12 may be forced rearward to operative position against the tension of the spring 29, and such rearward movement is limited by an adjustable stop screw 31 which engages the edge of the stand 10. This screw should be so adjusted that the rear or engaging ends of the gauge bars 17 and 18 will stand approximately at opposite ends of a diameter of the work, when the slide is at its rearward limit of movement.

The front end of the lever 13 cooperates with graduations formed on a plate 32 on the slide 12 to indicate the angular position of the part engaged by the bars 17 and 18. The plate 32 may be adjusted vertically by means of an adjusting screw 33 (Fig. 2) and may be secured in adjusted position by a binding screw 34 (Fig. 3).

Having described the details of construction of my invention, I will now describe its operation:—

The device is most commonly used for testing crank shaft forgings, and for this purpose the crank shaft is mounted on centers and is secured to an indexed plate 35 having recesses 36 corresponding to the correct angular relations of the different cranks. A stop pin 37 is mounted in a fixed bearing 38, and cooperates with the recesses 36 to determine the different angular positions of the shaft. When a crank is thus positioned the slide 12 is pushed rearward until the stop screw 31 engages the stand 10. Such movement causes the rear ends of the gauge bars 17 and 18 to be separated by engagement with the crank, and the link 21 insures equal movement of the gauge bars in opposite directions. Such movement also swings the gauge bar 18 about its pivot on the lever 13, and gives a direct indication of the diameter of the crank on the scale 24. At the same time the actual angular position of the crank will be indicated by the lever 13 and may be determined by reference to the scale on the plate 32.

A single movement of the slide 12 is therefore effective to indicate both the actual diameter of a crank and the angular position thereof. A second slide 40 may be mounted on the stand 10, having a device thereon to indicate the exact throw of the crank. As this device forms no part of my invention, the details thereof are not shown herein.

Having thus described my invention, it will be evident that changes and modifications can be made therein by those skilled in the art within the spirit and scope of my invention as set forth in the claims, and I do not wish to be otherwise limited to the details therein disclosed, but what I claim is:—

1. An indicating device having in combination a movable support, a pair of contact members mounted on said support, an indicating device connected to said members and effective to indicate the diameter of the work, and a second indicating device effective to simultaneously indicate the transverse position of the work relative to said support, both indications being on substantially enlarged scales.

2. An indicating device having, in combination, a movable support, a member movably mounted thereon, a pair of gauge bars movably mounted on said member, connections between said bars permitting equal movements thereof in opposite directions only, an indicating device effective to indicate the distance between said gauge bars, and a second indicating device effective to simultaneously indicate the mean angular position of said gauge bars thereof relative to said support.

3. An indicating device having, in combination, a movable support, a lever pivoted thereto, a pair of gauge bars pivoted to said lever, and a link reversely connecting said gauge bars, said support having indications for said lever, and said lever having indications for an extended portion of one of said gauge bars.

4. An indicating device having, in combination, a stand, a slide movably supported thereby, a lever on said stand, said slide and said lever each having indications thereon a pair of gauge bars pivoted on said lever, and a link reversely connected to said guage bars, one of said gauge bars being extended to cooperate with indications on said lever, and said lever being extended to cooperate with indications on said slide whereby the diameter and angular position of the work may be indicated.

5. In an indicating device, a graduated member, a pair of gauge bars pivoted thereto, and a link reversely connecting said gauge bars, one of said gauge bars having an extended portion cooperating with said graduations on said member to indicate work diameter on an enlarged scale.

In testimony whereof I have hereunto affixed my signature.

MARK H. DAMERELL.